Dec. 11, 1923.
E. M. SWARTZ
GARDEN TOOL
Filed April 7, 1923
1,477,302
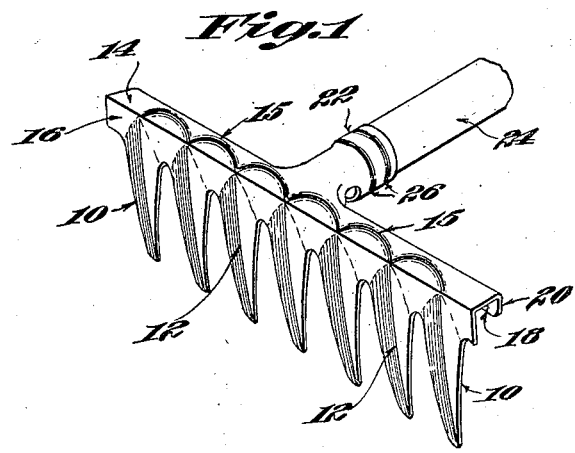
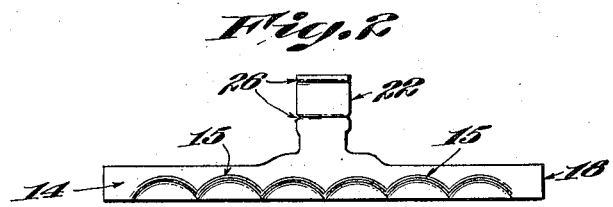
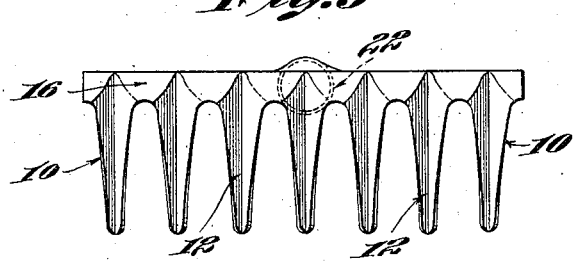
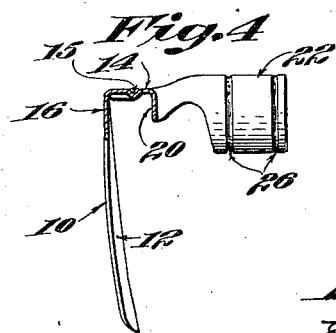
Inventor
Edward M. Swartz
by Warren G. Ogden
Attorney Patented Dec. 11, 1923.

1,477,302

UNITED STATES PATENT OFFICE.

EDWARD M. SWARTZ, OF ROXBURY, MASSACHUSETTS, ASSIGNOR TO KEYSTONE MFG. CO., OF BOSTON, MASSACHUSETTS, A CORPORATION OF MASSACHUSETTS.

GARDEN TOOL.

Application filed April 7, 1923. Serial No. 630,475.

*To all whom it may concern:*

Be it known that I, EDWARD M. SWARTZ, a citizen of the United States, residing at Roxbury, in the county of Suffolk and State of Massachusetts, have invented certain new and useful Improvements in Garden Tools, of which the following is a specification.

This invention relates to garden implements or tools and more particularly to the smaller sizes generally known as toy garden tools, although the invention is not limited to toy tools being generally useful in the manufacture of all tools of the character hereinafter described.

In using a garden tool such as a rake or a hoe a special strain is placed on the head of the tool from which extends the hollow-shank or other means for securing the tool to the handle. The need of strengthening the head of the tool to prevent breakage, particularly when the tool is made from a metal stamping, has been recognized by manufacturers and various suggestions to gain the desired end have been adopted, including the use of additional reinforcing pieces extending longitudinally of the head, An object of the present invention is to provide increased durability for the head of a stamped metal rake, hoe or the like, in a simple and inexpensive manner, reducing the number of operations required to make the tool and eliminating the necessity for extra strengthening parts.

To the accomplishment of these objects, and such others as may hereinafter appear from the following description, the invention comprises the features and parts hereinafter described and then particularly pointed out in the appended claims.

The preferred form of the invention, applied to a rake for illustrative purposes, is shown in the accompanying drawing in which: Figure 1 is a perspective view of a rake in which the invention is embodied; Figs. 2 and 3 are a plan and front view, respectively of the rake shown in Fig. 1; and Fig. 4 is a central, transverse sectional view of the same rake.

In the embodiment of the invention illustrated in the drawing the rake is produced from sheet metal by usual processes. The required shape of blank, for forming the teeth and the shank, is cut and is embossed by a die at the points and in the manner to carry out the purposes of the present invention. After producing the embossed blank it is bent to the form shown in the drawing and the shank then secured to a handle.

The blank cutting operation produces the teeth 10 each of which is provided with a centralized longitudinal embossing 12, which extends from top to bottom of the teeth and gives them a V-shaped transverse section. Further strength-giving embossing 14, as illustrated in the form of a longitudinal series of connected arcs 15, is formed at the upper ends of the teeth 10 adjacent the embossing 12. The embossing 12 extends across the solid portion or connecting apron 16 above the teeth and each arc 15 of the embossing 14 bridges the material of this apron, lying between adjoining teeth 10 and the cusps of the connecting arcs being opposite the center of each tooth. After the blank has been bent to the form shown in Fig. 1 the head 18 lies at right angles to the teeth 10 and the embossing 14 is then in a position to effectually resist any strain on the teeth which tends to bend or collapse the head transversely. To give further strength, and insure an exceedingly stiff rake head, a depending rear flange 20 is formed at the bending operation which lies opposite and parallel to the apron 16. A channel head construction providing excessive strength is thus produced in the simplest manner.

The blank provides metal arranged centrally at the rear of the head 18 to be bent into a cylindrical tang or shank 22 for securing the tool to a wood handle 24. Those skilled in the art are familiar with the formation of such a securing shank and further description will be confined to the novel manner of joining the metal to the wood which eliminates the use of nails or other independent fastening devices. After the wood handle has been inserted within the shank 22 the metal is embossed by circular beading 26 of sufficient depth to force the metal well into the softer wood and gain a secure hold thereon. Several of these peripheral beads 26 are preferably, although not necessarily, used to secure a firm connection, the drawing illustrating two such which have been found to be sufficient in practice. It will be understood that the utility of this feature of the invention is not confined to a rake but is equally efficient in securing the shank of any sheet metal garden tool to its handle.

While a particular form of embossing 14 for the tool head 18 is illustrated, it is within the scope of the invention to alter this form, or design, the important feature being the provision of an embossed head having the strength-giving channels arranged in such manner as to resist the strains placed on the head when the tool is used. Garden tools of the kind illustrated and described are well adapted for the toy gardening sets so widely used by children and the novel construction effectually resists the particularly hard usage to which they are subjected by the children, whereby the life of the tools is increased.

The preferred form of the invention having been described, and its scope having been indicated, what is claimed as new, is:—

1. A one-piece garden tool formed from a metal stamping bent to provide an operating portion and a channel-shaped head reinforced by embossing which stiffens said head throughout the length of said operating portion.

2. A one-piece garden tool formed from a metal stamping and provided with a channel-shaped head reinforced by embossing extending transversely of the base member of the channel formation.

3. A sheet metal rake having a channel-shaped head, teeth extending from one wall of said channel, embossing in the base of the channel comprising a series of arcs spaced to embrace the metal between each two adjoining teeth, and a shank extending from the opposite wall of the channel.

4. A sheet metal rake having a channel-shaped head, teeth extending from one wall of said channel, embossing in the base of the channel comprising connected arcs bowed transversely of the channel arranged with their cusps opposite the center of each tooth, and a shank extending from the opposite wall of the channel.

EDWARD M. SWARTZ.